United States Patent [19]
Zillgitt et al.

[11] Patent Number: 5,105,342
[45] Date of Patent: Apr. 14, 1992

[54] HEADLIGHT FOR A MOTOR VEHICLE HAVING AN ADJUSTABLE MOTOR-DRIVEN REFLECTOR

[75] Inventors: Ulrich Zillgitt, Remshalden, Fed. Rep. of Germany; Harald Speer, Benningen, Belgium; Kurt Haug, Reutlingen, Fed. Rep. of Germany; Georg Ebinger, Kusterdingen, Fed. Rep. of Germany; Miervaldis Millers, Reutlingen, Fed. Rep. of Germany; Heinrich Hasselmann, Nürtingen, Fed. Rep. of Germany

[73] Assignee: Robert Bosch GmbH, Stuttgart, Fed. Rep. of Germany

[21] Appl. No.: 740,329

[22] Filed: Aug. 5, 1991

Related U.S. Application Data

[62] Division of Ser. No. 536,651, Jun. 27, 1990.

[30] Foreign Application Priority Data

Dec. 30, 1988 [DE] Fed. Rep. of Germany ....... 3844269

[51] Int. Cl.⁵ .............................................. F21M 3/22
[52] U.S. Cl. ........................................ 362/66; 362/69; 362/286; 362/287; 362/428
[58] Field of Search ............... 362/66, 67, 69, 70, 362/269, 271, 272, 273, 286, 287, 289, 427, 428

[56] References Cited

U.S. PATENT DOCUMENTS

| 4,186,428 | 1/1980 | Deverrewaere | 362/286 |
| 4,217,631 | 8/1980 | Bergkvist | 362/66 |
| 4,916,587 | 4/1990 | Hirose et al. | 362/66 |
| 4,967,319 | 10/1990 | Seko | 362/66 |

Primary Examiner—Ira S. Lazarus
Assistant Examiner—Richard R. Cole
Attorney, Agent, or Firm—Michael J. Striker

[57] ABSTRACT

The headlight for a motor vehicle has with an electromotive adjusting device (5) for adjusting a reflector (2). The adjusting device (5) include an electric motor (7) and a step-down gear unit which are accommodated in a housing part (12) which is arranged within the headlight housing (1). The step-down gear unit includes a small worm gear (8) and a large toothed wheel (9) with radial teeth. A rotational movement of the toothed wheel (9) is transformed via a thread between the toothed wheel (9) and the housing part (12) into a movement of the toothed wheel (9) along an axis (6) determining the adjusting direction. The toothed wheel (9) is connected with the reflector (2) a ball-ended spindle which is held pivotally with one spherical end in a spindle receptacle attached to the toothed wheel so that, when the toothed wheel moves along the axis, the spindle moves to adjust the reflector. A deflecting gear unit with an adjusting part extending outside the headlight housing can be provided, which is coupled to the spindle so that the reflector can also be adjusted manually with the adjusting part.

5 Claims, 3 Drawing Sheets

HEADLIGHT FOR A MOTOR VEHICLE HAVING AN ADJUSTABLE MOTOR-DRIVEN REFLECTOR

BACKGROUND OF THE INVENTION

The present invention relates to a headlight for a motor vehicle. This application is a divisional application of application Ser. No. 536,651, filed June 27, 1990.

A headlight for a motor vehicle having an adjustable motor-driven reflector is known from DE-PS 30 48 751. The headlight is provided with an electromotive adjusting device for adjusting the inclination of parts of the headlight. The adjusting device is accommodated in its own housing and comprises an electric motor and a step-down gear unit. The housing with the adjusting device is attached to the rear side of the headlight housing with a supporting frame. The step-down gear unit of the adjusting device is connected with the parts of the headlight to be adjusted via a coupling element.

The disadvantage of this headlight is that a very deep installation space is required for the headlight because of the separately mounted housing of the adjusting device. In order to protect the adjusting device from soiling, it is necessary to take steps for sealing at the housing. Other disadvantages consist in that the headlight housing must comprise required special fastening elements for attaching the housing and a separate cable guide is required for the electrical connection of the electric motor.

SUMMARY OF THE INVENTION

It is an object of the present invention to provide an inclination-adjustable headlight for a motor vehicle, which is more compact than the current inclination-adjustable headlight and whose inclination-adjusting mechanism is sealed to prevent soiling.

The headlight, according to the invention, with the characterizing features of the main claim, has the advantage that the housing part receiving the adjusting device is arranged within the headlight housing, so that the installation depth of the headlight is reduced and no sealing of the housing part is required.

An advantageous integrated arrangement of the step-down gear unit in the housing part with few individual parts to be mounted is possible. In this arrangement the step-down gear unit of the adjusting device has a small worm gear, which is driven by an electric motor and is oriented transversely relative to the longitudinal axis of the headlight and a toothed wheel having radially disposed external teeth coaxially positioned with respect to the longitudinal axis, which engages with the worm gear. The toothed wheel also has a bore hole which extends in the axial direction and has an internal thread, while the housing part has a journal which projects in the axial direction toward the toothed wheel and which has an external thread. The toothed wheel thus is engaged on the journal so as to move axially as it rotates about the journal. The toothed wheel is connected with the reflector on its end remote from the housing part via an adjusting element. This adjusting element can be a cylindrical shaft extending axially of the toothed wheel, which has an external thread on which an articulated part coupled rotatably with the reflector is advantageously screwed, however the thread between the articulated part and the shaft runs opposite to the thread between the toothed wheel and the housing part. An increased adjusting range is achieved in the headlight by means of the construction of the connection of the step-down gear unit with the articulated part. Further features according to the invention enable a basic adjustment of the headlight from outside the headlight housing. The position of the part of the step-down gear unit connected with the headlight reflector is determined in a simple manner by providing a potentiometer oriented in the axial direction in the housing part in the vicinity of the toothed wheel and connected with the toothed wheel via a stirrup and also means for connecting the stirrup electrically to terminals on the headlight housing.

BRIEF DESCRIPTION OF THE DRAWING

The objects, features and advantages of the present invention will now be illustrated in more detail by the following detailed description, reference being made to the accompanying drawing, in which.

DETAILED DESCRIPTION OF THE INVENTION

Figure 1:
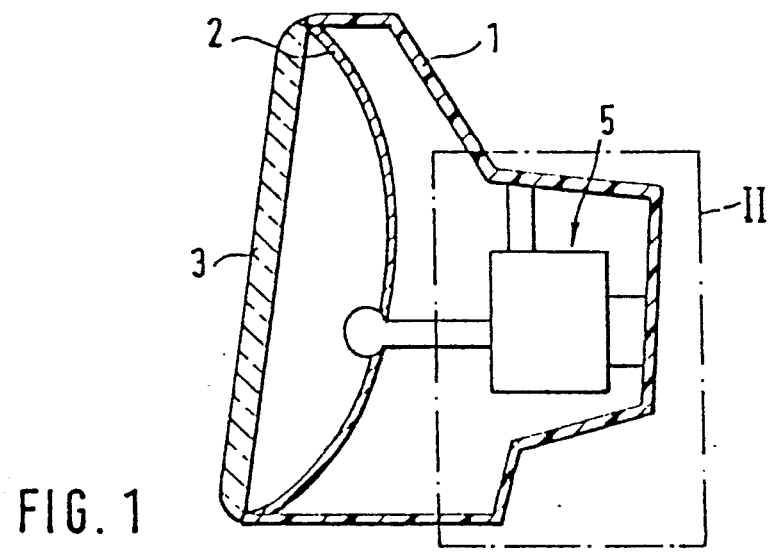
FIG. 1 is a longitudinal cross sectional view through a headlight having adjustable inclination means.

A headlight for motor vehicles is shown in FIG. 1 in a simplified diagram. The headlight comprises a headlight housing 1, a reflector 2 with diffusing lens 3, and an electromotive adjusting device 5 arranged in the headlight housing 1 for adjusting the inclination of the reflector 2.

The electromotive adjusting device 5 comprises an electric motor 7 arranged transversely with respect to an axis 6 determining the adjustment direction and a step-down gear unit formed from a small worm gear 8, which is likewise arranged transversely relative to the axis 6, and a large toothed wheel 9 which has a radial toothing engaged with the worm gear 8 and is arranged in the axial direction 6. The toothed wheel 9 is displaceable in the axial direction 6 relative to the worm gear 8. The electric motor 7 and the step-down gear unit are accommodated in a housing part 12. A threaded journal 14 projects from the housing part 12 in the axial direction 6 toward the reflector 2. The toothed wheel 9 is provided with a threaded bore hole 15 extending in the axial direction 6 and is screwed on the threaded journal 14. The worm gear 8 is driven by the electric motor 7 and meshes in the radial teeth of the toothed wheel 9.

Figure 2:
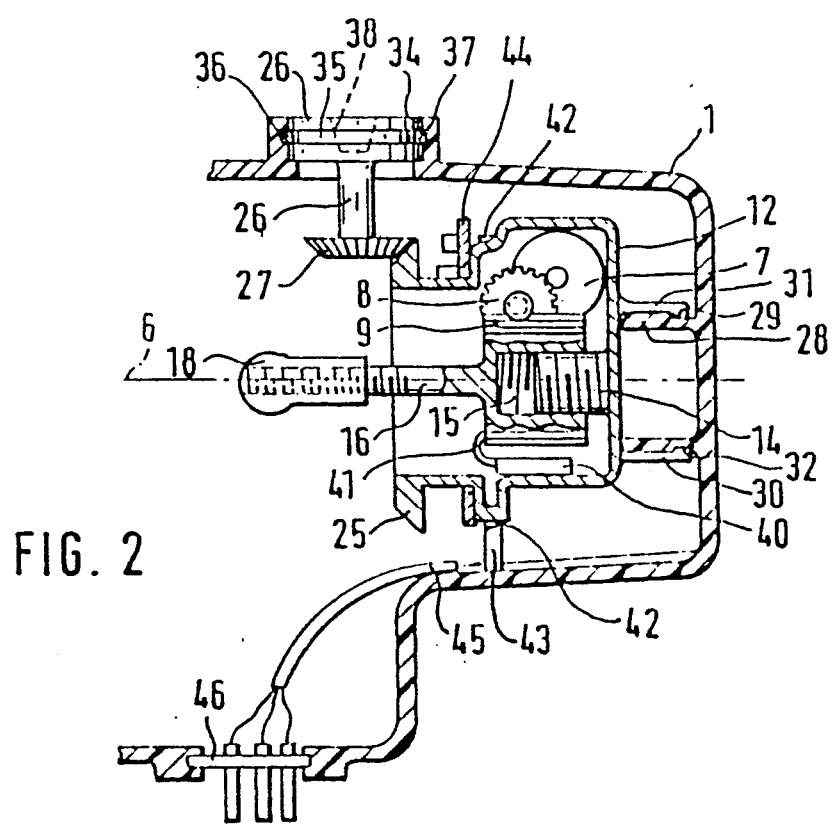
FIG. 2 is a longitudinal cross sectional view of a portion of an adjustable-inclination headlight shown in dot-dashed lines II in FIG. 1 according to one embodiment of the present invention.

In the first embodiment example shown in FIG. 2, the toothed wheel 9 has a cylindrical shaft 16 which faces toward the reflector 2 and has an external thread. An articulated part 18 which is coupled with the reflector 2 so as to be rotatable, but so as to be fixed with respect to rotation relative to the axis 6, is screwed onto the shaft 16. The thread between the articulated part 18 and the shaft 16 runs opposite the thread between the toothed wheel 9 and the housing part 12.

A journal projecting member 28 with an annular groove 29 projects inward from the headlight housing 1, as shown in FIG. 2. A hollow journal 30 which is formed on the housing part 12 and provided with two longitudinal slots 31 is slipped over the journal projecting member 28 and catches in the annular groove 29 with projections 32 which project at its end toward the journal projecting member 28. A first bevel wheel 25 is formed at the end of the housing part 12 facing the reflector 2. An adjusting shaft 26 projects into the headlight housing 1 perpendicular to the axis 6, a second bevel wheel 27 being formed on at its end, which second bevel wheel 27 engages continuously with the first bevel wheel 25. The adjusting shaft 26 is supported in a bore hole 34 of the headlight housing 1 so as to be rotatable. The adjusting shaft 26 has an annular groove 35 in the vicinity of the bore hole 34 and the bore hole is provided with an annular groove 36 and an O-ring 37 is clamped between the annular grooves 35 and 36. The rotational movement of the adjusting shaft 26 is obstructed by the O-ring 37 and the adjusting shaft 26 is secured axially in the headlight housing 1. The adjusting shaft 26 is provided with a hexagon socket 38 on its front side projecting out of the headlight housing 1. A potentiometer 40 is inserted into a guide in the housing part 12 in the axial direction 6. The potentiometer 40 is connected with the toothed wheel 9 in the axial direction 6 via a stirrup 41. A slip ring 42 is arranged on the circumference of the housing part 12 and a slider 43 is arranged on the inside of the headlight housing 1 located radially opposite the slip ring. A printed circuit board 44 which serves for the contact of the electric motor 7 and the potentiometer 40 is connected with the slip ring 42. The slider 43 is connected via electric lines 45 with a central plug connector 46 and, via the latter, with a voltage source, not shown, and a control.

The function of the adjusting device is explained in the following. The toothed wheel 9 is driven by the electric motor 7 and the worm gear 8 so as to be set in rotational movement around the axis 6. As a result of the thread between the toothed wheel and the housing part 12, the toothed wheel 9 moves forward or backward in the axial direction 6 depending on the rotating direction of the electric motor 7.

The articulated part 18 moves not only along the path covered by the toothed wheel 19, but also along the path covered by the articulated part 18 as a result of the thread between the articulated part 18 and the shaft 16 relative to the shaft 16. An increased adjusting area of the reflector 2 is accordingly achieved.

A basic adjustment of the reflector 2 is enabled via the adjusting shaft 26. The housing part 12 is rotated around the projecting member 28 relative to the headlight housing 1 via the bevel wheels 25 and 27 when the adjusting shaft 26 is actuated. A displacement of the articulated part 18 in the axial direction 6 is effected by means of the self-locking of the step-down gear unit via the thread between the toothed wheel 9 and the articulated part 18. The O-ring 37 clamped between the adjusting shaft 26 and the bore hole 34 prevents an unintentional rotation of the adjusting shaft 36.

Figure 3:
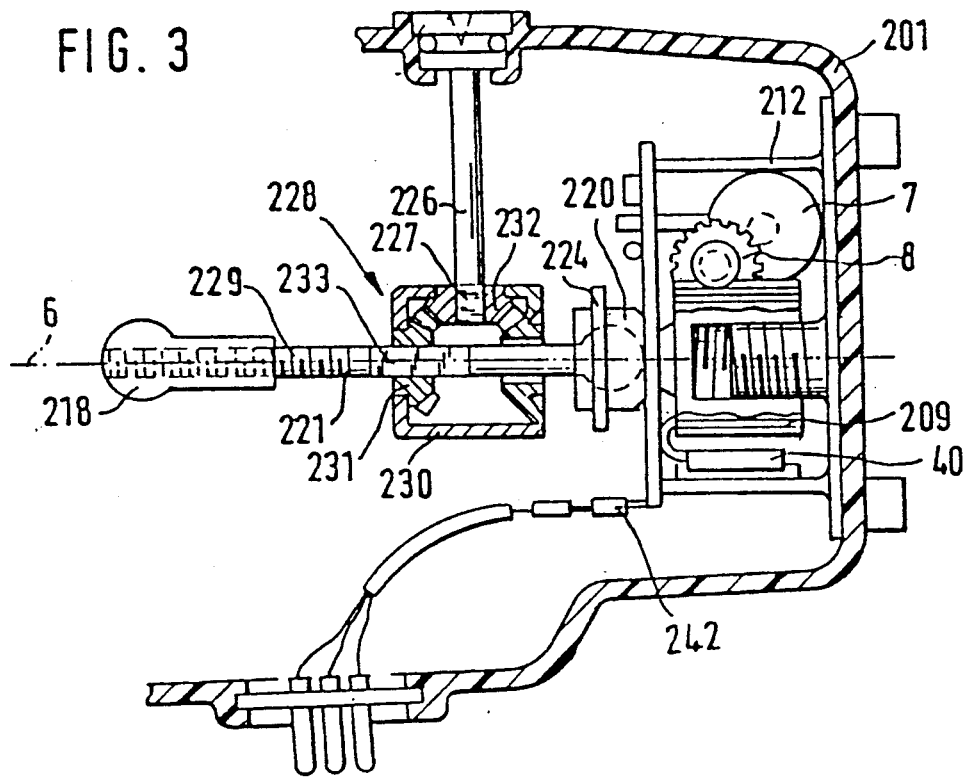
FIG. 3 is a longitudinal cross sectional view of a portion of an adjustable-inclination headlight shown in dot-dashed lines II in FIG. 1 according to another second embodiment of the present invention.

A second embodiment example of the headlight with a step-down gear unit constructed in the same manner as in FIG. 2 is shown in FIG. 3. The housing part 212 in which the electric motor 7 and the step-down gear unit are arranged again is now screwed securely to the headlight housing 201. The slip ring 42 and the slider 43 are accordingly dispensed with and can be replace by fixed connections 242. In contrast to FIG. 2, the toothed wheel 209 further comprises a ball-ended spindle receptacle 220 on its side facing the reflector 2, the spherical end of a ball-ended spindle 221 engaging in the latter. A securing ring 224 is slid over the ball-ended spindle receptacle 220. The articulated part 218 is coupled with the reflector 2 so as to be rotatable, but so as to be fixed with respect to rotation around the axis 6, and is connected with the ball-ended spindle 221 via a thread 229. The adjusting shaft 226 projects into the headlight housing 201 vertically relative to the axis 6 and engages in a deflecting gear unit 228 with which the ball-ended spindle 221 is also coupled. The rotational movement of the adjusting shaft 226 is transformed into a rotational movement of the ball-ended spindle 221 around the axis 6 by means of the deflecting gear unit 228. The deflecting gear unit 228 comprises two bevel wheels 231, 232 arranged in a gear unit housing 230 at right angles relative to one another, one of the bevel wheels 231, 232 being arranged on the axis 6. The bevel wheel 231 is guided on the ball-ended spindle 221 so as to be displaceable along the axis 6. The ball-ended spindle 221 is coupled with the bevel wheel 231 in the circumferential direction via a square 233. The adjusting shaft 226 engages in the bevel wheel 232 with a square 227 formed on at its end. The rotational movement of the toothed wheel 209 is transformed into an axial movement of the toothed wheel 209 in the axial direction 6 via the thread between the toothed wheel 209 and the housing part 212. The rotational movement of the toothed wheel 209 is not transmitted to the ball-ended spindle 221, since the latter is rotatably supported in the ball-ended spindle receptacle 220.

A basic adjustment of the reflector 2 is enabled via the adjusting shaft 226. The ball-ended spindle 221 is rotated around the axis 6 during an actuation of the adjusting shaft 226, and the articulated part 218 is accordingly moved along the thread 229 in the axial direction 6.

Figure 4:
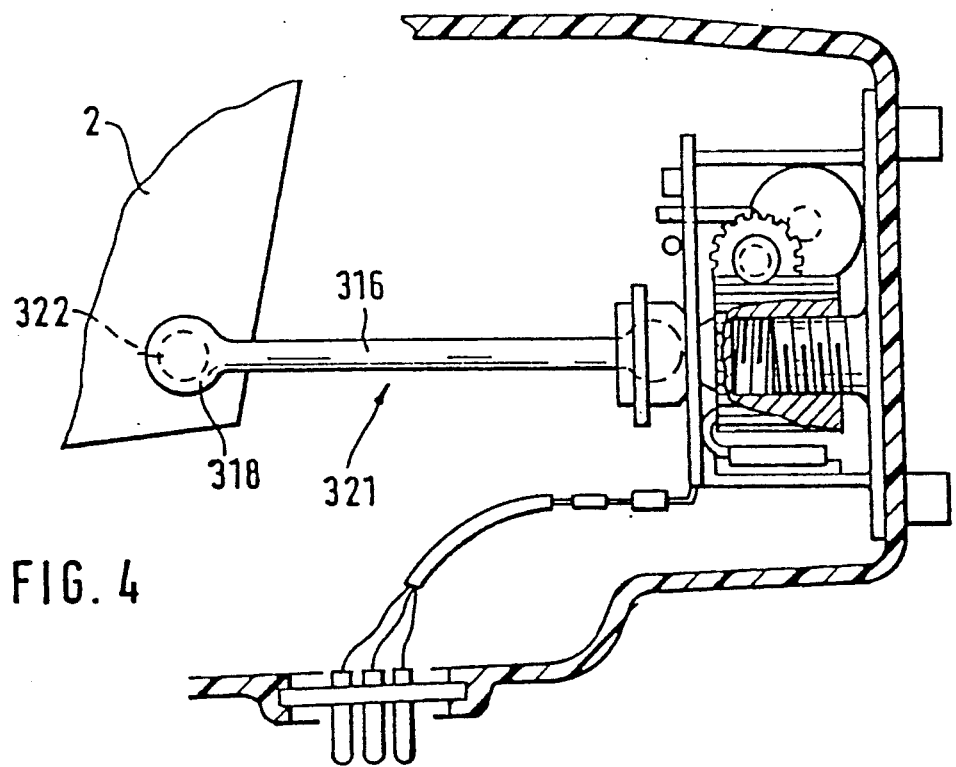
FIG. 4 is a longitudinal cross sectional view of a portion of an adjustable-inclination headlight shown in dot-dashed lines II in FIG. 1 according to an additional variation of the other second embodiment of the present invention, i.e. an additional third embodiment of the present invention.
Figure 5:
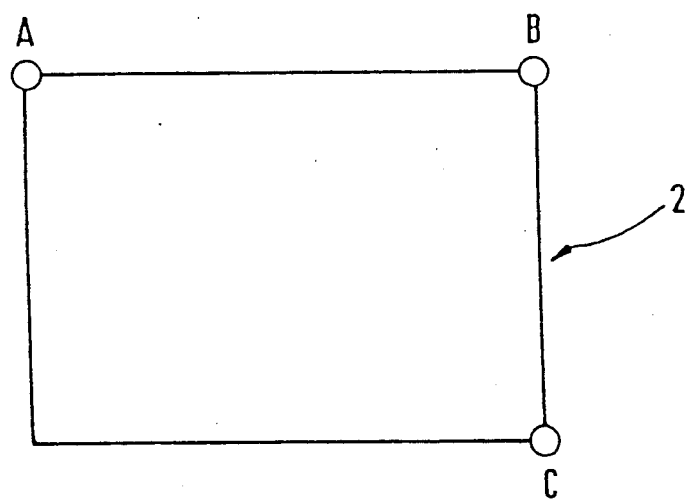
FIG. 5 is a front view of a reflector used in the invention.

In a variant of the second embodiment example shown in FIG. 4, the mechanism of the adjusting device 321 is changed so that the deflecting gear unit is dispensed with in this case. The ball-ended spindle comprises a shaft 316 with a ball head with a spherical receptacle 318, which shaft 316 faces the reflector 2, the ball-head receptacle head 322 formed on the reflector 2 receives the ball head 318. The adjustment of the reflector 2 via the adjusting device is effected as in the second embodiment example. The basic adjustment of the reflector 2 is carried out at the upper bearings A, B of the reflector, shown schematically in FIG. 5. A basic adjustment in the horizontal direction is enabled by means of an adjustment of the bearing A, while both bearings A and B must be adjusted in the same direction for a basic adjustment in the vertical direction. The adjusting device acts at point C.

It will be understood that each of the elements described above, or two or more together, may also find a useful application in other types of structures differing from the types described above.

While the invention has been illustated and described as embodied in an adjustable headlight for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In a headlight having a headlight housing, a reflector in the headlight housing and an electromotive adjusting device for adjusting the reflector, said adjusting device comprising a housing part, an electric motor, a step-down gear unit connected with the reflector and the electric motor and an adjusting element for adjusting the reflector actuatable by the step-down gear unit, said adjusting element having an axis, the improvement wherein the housing part with the adjusting device is located in the headlight housing and is nonrotatably mounted to the headlight housing so as to be nonrotatable with respect to rotation around the axis of the adjusting element and held fixed with respect to displacement along the axis and with respect to a transverse motion from the axis, said step-down gear unit being associated with the housing part and comprising a small worm gear connected with and driven by the electric motor, the worm gear being oriented transversely relative to the axis of the adjusting element, and a toothed wheel positioned coaxially on the axis, the toothed wheel having a plurality of radially oriented teeth for engagement in the worm gear, the toothed wheel being provided with a bore hole extending along the axis, the bore hole having an internal thread and the housing part being provided with a journal which projects along the axis toward the toothed wheel, said journal being provided with an external thread, the journal being engaged in the bore hole so that the toothed wheel is connected with the housing part so as to be movable by rotation along the axis on rotation of the worm gear, and the toothed wheel being connected with the reflector on a side removed from the housing part via the adjusting element, and wherein the toothed wheel is provided with a ball-ended spindle receptacle facing the reflector and the adjusting element comprises a ball-ended spindle having one spherical end and another end opposite the one spherical end, said spherical end engaging pivotally in said ball-ended receptacle and said other end engaging with said reflector so as to couple said ball-ended spindle and said reflector, so that, when said toothed wheel moves along said axis, said ball-ended spindle pivots and adjusts said reflector.

2. The improvement as defined in claim 1, said ball-ended spindle having an articulated part connected with the other end of the ball-ended spindle opposite to said spherical end, said articulated part being pivotally coupled with the reflector so that said reflector can be pivotally adjusted by said ball-ended spindle on rotation of said toothed wheel.

3. The improvement as defined in claim 2, wherein said articulated part is connected with the reflector so as to be secured with respect to rotation around the axis and the ball-ended spindle is provided with a thread on which said articulated part engages, and further comprising a deflecting gear unit coupled with said ball-ended spindle and an adjusting part projecting into the headlight housing transversely relative to the ball-ended spindle and engaging with one end in the deflecting gear unit, said adjusting part being supported in the headlight housing and rotatable after exceeding a predetermined circumferentially applied force and another end of said adjusting part opposite to said one end projecting out of the head light housing for actuation of said adjusting part, the deflecting gear unit being structured so that a rotational movement of the adjusting part is transformed into a rotational movement of the ball-ended spindle via the deflecting gear unit.

4. The improvement as defined in claim 1, wherein said ball-ended spindle has a ball-head having a spherical receptacle therein on the other end opposite to said spherical end and said reflector has a ball head positioned facing the spindle so that said ball head can be pivotally held in said ball headed of said ball-ended spindle.

5. The improvement as defined in claim 1, further comprising a potentiometer extending in the housing part in an axial direction and being connected with the toothed wheel via a stirrup, said potentiometer being located in the vicinity of the housing part located radially opposite the toothed wheel.

* * * * *